United States Patent [19]

Tamatani et al.

[11] Patent Number: 4,518,985

[45] Date of Patent: May 21, 1985

[54] PROJECTION TYPE GREEN CATHODE RAY TUBE, METHOD FOR MANUFACTURING PHOSPHOR SCREEN FOR THE SAME, AND PROJECTION VIDEO DEVICE USING THE SAME

[75] Inventors: Masaaki Tamatani, Fujisawa; Nobuyuki Tsuda, Kawasaki; Norio Koike; Sakae Ajiro, both of Fukaya, all of Japan

[73] Assignee: Tokyo Shibaura Denki Kabushiki Kaisha, Kawasaki, Japan

[21] Appl. No.: 384,947

[22] Filed: Jun. 4, 1982

[30] Foreign Application Priority Data

Jun. 10, 1981 [JP] Japan .................................. 56-88251

[51] Int. Cl.$^3$ ................................................ H04N 9/31

[52] U.S. Cl. ................................ 358/60; 252/301.4 R

[58] Field of Search .................. 358/60; 340/700, 720; 252/301.4; 313/467

[56] References Cited

U.S. PATENT DOCUMENTS

| | | | |
|---|---|---|---|
| 2,590,240 | 3/1952 | Epstein | 358/60 |
| 2,776,908 | 1/1957 | Smith | 117/33.5 |
| 2,989,584 | 6/1961 | Mengle | 358/60 |
| 3,617,332 | 11/1971 | Lehmann | 117/33.5 C |
| 3,898,174 | 8/1973 | Lehmann | 252/301.4 |
| 3,984,587 | 10/1976 | Lipp | 313/467 |
| 4,216,408 | 8/1980 | Verstegen et al. | 313/467 |

FOREIGN PATENT DOCUMENTS 835153 5/1960 United Kingdom .

OTHER PUBLICATIONS

W. Lehmann et al., "Cathodoluminescence of CaS:-Ce$^{3+}$ and CaS:Eu$^{2+}$ Phosphors", *Journal of Electrochemical Society*, vol. 118, p. 477.

*Primary Examiner*—Richard Murray
*Attorney, Agent, or Firm*—Oblon, Fisher, Spivak, McClelland & Maier

[57] ABSTRACT

A projection type green cathode ray tube (CRT) with improved brightness despite an increase in the temperature of the faceplate, a method for manufacturing a phosphor screen adopted therein, and a projection video device which utilizes the projection type green CRT. The phosphor screen of the CRT is formed of a cerium-activated calcium sulfide phosphor which contains 0.01 to 0.3 mol% of cerium. According to the method for manufacturing the phosphor screen, the cerium-activated calcium sulfide phosphor is precipitated in a 0.3 to 5% aqueous solution of water glass based on weight. The aqueous solution does not contain barium ions. The projection video device includes the green CRT, a red CRT having a phosphor screen which is formed of an europium-activated yttrium oxide phosphor, and a blue CRT having a phosphor screen which is formed of a silver-activated zinc sulfide phosphor. Brightness of images is improved and does not substantially change over time.

7 Claims, 7 Drawing Figures

PROJECTION TYPE GREEN CATHODE RAY TUBE, METHOD FOR MANUFACTURING PHOSPHOR SCREEN FOR THE SAME, AND PROJECTION VIDEO DEVICE USING THE SAME

BACKGROUND OF THE INVENTION

1. Field of the Invention

The present invention relates to a projection type green cathode ray tube (CRT) and, more particularly, to a projection type green light-emitting CRT which has a phosphor screen formed by a cerium-activated calcium sulfide phosphor. The present invention further relates to a method for manufacturing the phosphor screen and to a projection video device which includes the green CRT described above.

2. Description of the Prior Art

Projection video devices enlarge images on the CRT and project them on a large screen. High brightness CRTs used in these devices are called projection type CRT.

The projection video devices are mainly used to reproduce TV images for education and leisure. It is expected that high-density scanning technique (high resolution) of the screen is further improved in TV broadcasting and video systems for a variety of appli- cations.

In order to maximize brightness of an image reproduced on the large screen, electron beams are emitted on the phosphor screen of the projection type CRT with energy of more than 10 times the energy applied to a phosphor screen of a display color CRT. For this reason, the temperature of the phosphor screen is increased up to 150° C. at maximum in the normal operation. However, brightness of the phosphor screen is generally decreased with an increase in the temperature of the phosphor screen.

When a white image is reproduced on the projection screen, using a projection color video device, about 70% of the total brightness is obtained by green color components. The phosphor screens of the green CRTs used in the conventional projection video devices are formed of manganese-activated zinc silicate or terbium-activated gadolinium oxysulfide phosphors. The former phosphor has a low fluorescent efficiency upon radiation with electron beams and is "burnt" by high electron energy, resulting in degradation in the quality of the phosphor screen. On the other hand, the latter phosphor has a high fluorescent efficiency upon radiation with electron beams. However, this fluorescent efficiency is significantly decreased with an increase in the temperature of the phosphor screen. For this reason, the faceplate of the CRT is cooled by air from the fan. However, this does not provide satisfactory effects. Color images become reddish after some time from the beginning of projection. Therefore, a contrast adjustment must be performed again, resulting in inconvenience.

SUMMARY OF THE INVENTION

It is, therefore, the object of the present invention to provide a projection type green light-emitting cathode ray tube wherein brightness is not degraded with an increase in the temperature of a phosphor screen.

It is another object of the present invention to provide a method for manufacturing a phosphor screen of the projection type green CRT.

It is still another object of the present invention to provide a projection video device which includes the projection type green CRT to reproduce images with sufficient brightness.

The present invention is based on the facts that, when the phosphor screen of the green CRT is formed of a cerium-activated calcium sulfide phosphor containing 0.01 to 0.3 mol % of cerium, brightness of the phosphor screen is not substantially degraded even though the phosphor screen is kept at a high temperature, thus preventing degradation of brightness due to an increase in the temperature of the phosphor screen.

In order to achieve the above object of the present invention, there is provided a projection type green cathode ray tube comprising: a main body having a transparent faceplate; a phosphor screen formed on the inner surface of said faceplate, said phosphor screen including a cerium-activated calcium sulfide phosphor containing 0.01 to 0.3 mol % of cerium; and means housed in said main body for radiating electron beams on said phosphor screen, said means being capable of radiating the electron beams with sufficient energy so as to project an image on said faceplate onto an external screen.

The phosphor screen according to the present invention is prepared according to a method comprising the steps of: suspending the cerium-activated calcium sulfide phosphor in a 0.3 to 5% by weight aqueous solution of water glass; pouring the suspension into a CRT which contains pure water; and precipitating the cerium-activated calcium sulfide phosphor on the inner surface of the faceplate to obtain the phosphor screen.

Further, the projection video device according to the present invention comprises a projection type green CRT having the phosphor screen prepared above, a projection blue CRT with a phosphor screen made of a silver-activated zinc sulfide phosphor, a projection red CRT with a phosphor screen made of an europium-activated yttrium oxide phosphor, and a color image reproducing means. Thus, very bright images are reproduced on the screen.

DETAILED DESCRIPTION OF THE PREFERRED EMBODIMENT

Figure 1:
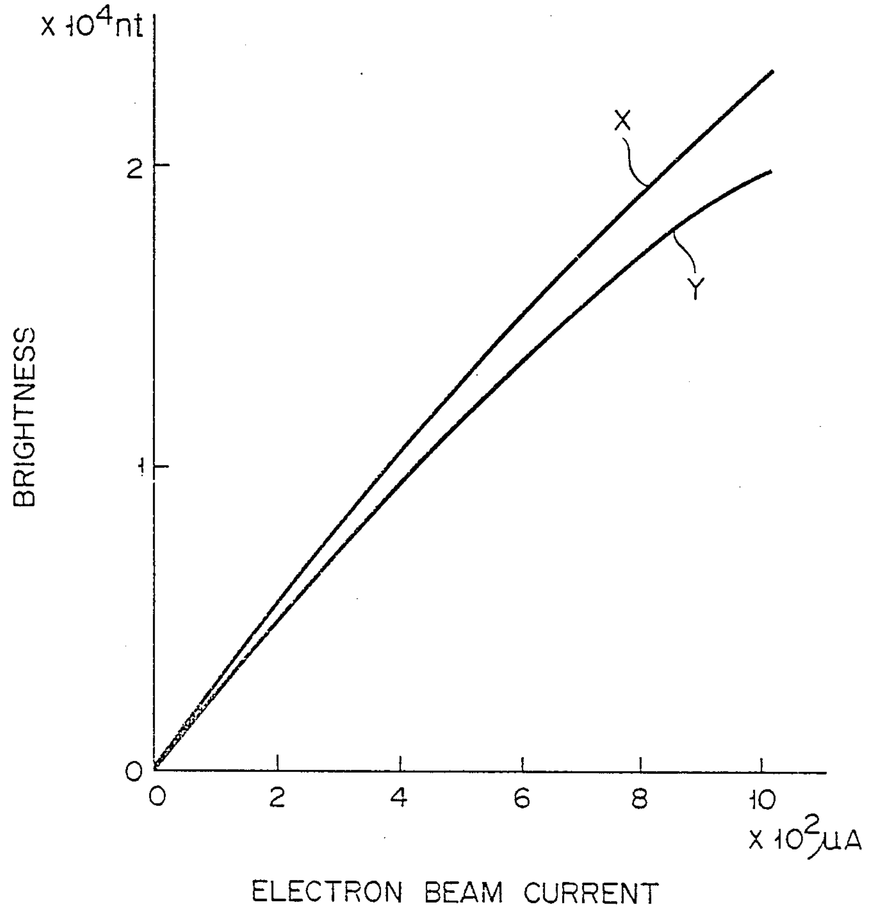
FIG. 1 is a graph showing brightness of a CRT according to the present invention as a function of an electron beam current thereof in comparison with brightness of a conventional CRT as a function of an electron beam current thereof.

Cerium-activated calcium sulfide phosphor is known as a phosphor which emits green light. The present inventors have found that brightness of the CRT is not substantially degraded even though a phosphor screen is heated to a high temperature, if the phosphor screen is made of a cerium-activated calcium sulfide phosphor which contains 0.01 to 0.3 mol % of cerium. The above-mentioned feature has not been found in other known high efficient green light-emitting phosphors. If the phosphor screen of the projection type green CRT which is heated to a high temperature is made of the above-mentioned cerium-activated calcium sulfide phosphor, brightness of the phosphor screen may not be degraded due to a high temperature and an excellent projection type CRT is obtained.

The phosphor screen of the CRT according to the present invention cannot be manufactured by a method for manufacturing a phosphor screen of a conventional display type color CRT. Because calcium sulfide is relatively chemically unstable in air and in water, and therefore, the phosphor film is gelled in a sensitizer slurry which is used in the conventional method for preparing the phosphor screen of the display type color CRT.

The present inventors have adopted a precipitation method which is used for forming a phosphor screen of a black-and-white CRT and an industrial CRT such as an oscilloscope CRT. According to this method, the faceplate of the CRT faces downward and pure water is poured therein. A suspension consisting of water, water glass, and a phosphor is added to the pure water. The phosphor then sediments on the inner surface of the faceplate (glass screen). Water glass has a general formula of $K_2O.3SiO_2$. However, sodium water glass may also be used. A barium salt is generally contained in the aqueous solution of water glass because the barium salt reacts with water glass to produce a colloidal compound $BaO.xSiO_2$ which acts as a coupling agent between a precipitated film and the glass screen. However, if this method is utilized to form the phosphor screen according to the present invention, the barium salt reacts with calcium sulfide to gell calcium sulfide, resulting in inconvenience. After extensive studies, the present inventors have found that the glass screen and the phosphor screen are adhered well without the barium salt if the concentration of the water glass is 0.3% by weight or more. However, if the content of glass water exceeds 5% by weight, calcium sulfide reacts with a lacquer film in the subsequent process of lacquer filming, resulting in coagulation of the phosphor film which causes irregular brightness on the CRT screen. Therefore, water glass is preferably contained in the amount of not more than 5% by weight.

The phosphor screen of the CRT according to the present invention can be manufactured by the following steps.

A cerium-activated calcium sulfide phosphor which contains 0.01 to 0.3 mol % of cerium is prepared. A suspension comprising this phosphor, water and water glass is prepared. Meanwhile, the transparent faceplate of the CRT faces downward and pure water is poured therein. The suspension is then added to the pure water. The content of the water glass is within a range of 0.3 to 5% by weight when the suspension is added to the pure water. The CRT is kept in this condition for a predetermined period of time. As a result, a phosphor film is precipitated on the inner surface of the CRT faceplate.

After the phosphor film is formed, the inner surface of the faceplate of the CRT is processed in the same manner as the conventional method. After the phosphor is precipitated on the faceplate of the CRT, the CRT is turned up side down to discharge water. The phosphor film (screen) is dried, then rewetted, and a lacquer is sprayed on the surface of the phosphor screen to form a lacquer film. Aluminum is then deposited on the lacquer film. Thus manufactured CRT is placed in a furnace and baked at a temperature of 400° to 450° C. to remove the lacquer film.

EXAMPLES 1 to 60

400 g of calcium carbonate and 0.07 to 20.7 g of cerium oxide ($CeO_2$) were dissolved in 850 g of 60% nitric acid. The amount of cerium oxide was varied so that the content of cerium in a cerium-activated calcium sulfide may be 0.01 mol %, 0.03 mol %, 0.1 mol %, 0.3 mol %, 1 mol % or 3 mol %, respectively. Oxalic acid in the amount of 560 g was added to the above solution to precipitate an oxalate of calcium and cerium. This precipitate was washed with water and dried. The dried precipitate was mixed with 32 g of lithium carbonate and 180 g of sulfur. The mixture was then placed in a quartz crucible which was then covered. The mixture was fired at a temperature of 950° C. for 1 hour. The fired material was sifted with a nylon mesh and washed with water well. The washed material was then filtered with filtering paper, replacing the water by ethanol, and a residue was dried to give six kinds of cerium-activated calcium sulfide phosphors which contained cerium in the amounts of 0.01 mol %, 0.03 mol %, 0.1 mol %, 0.3 mol %, 1 mol % and 3 mol %, respectively. The phosphors obtained in these examples can be expressed by the formula of $Ca^{2+}(Ce^{3+}, Li^{+})S^{2-}$.

Then the phosphor was formed in a powder form, particle size of which is in the order of 8 μm. 0.75 g of phosphor particles, aqueous solution of water glass which contained 25% of $K_2O.3SiO_2$ by weight, and water were mixed and stirred to prepare a suspension of 200 ml total volume. The amount of water glass was varied as described later. The faceplate of the 7" CRT faced downward and 400 ml of pure water at a temperature of not more than 25° C. was poured therein. The suspension of 200 ml was added to the pure water and left to stand for 30 minutes. The amount of the aqueous solution of water glass, which is used in making this suspension, is varied so that the content of water glass after addition to the pure water of 400 ml may be 0.21% by weight, 0.33% by weight, 0.83% by weight, 2.08% by weight, 4.17% by weight, 5.00% by weight, or 6.25% by weight. After 30 minutes, a phosphor was precipitated to form a precipitate film on the inner surface of the faceplate of the CRT. A supernatant liquid was then discharged to form a phosphor screen. In Examples 49 to 60, phosphor screens were prepared in the conventional precipitation method which is the same as the above method except that 6 or 10 ml of 2% barium nitrate aqueous solution was added to pure water. The conditions of the phosphor screens were examined and recorded.

Thereafter, lacquer films of nitrocellulose lacquer were formed on the phosphor screens by the conventional laquer filming method. Aluminum was then deposited and baking was performed to prepare CRTs. The reaction between the phosphor screens and the lacquer films during the lacquer filming process was examined and recorded. Further, a voltage of 28 KV was applied across the CRTs and relative brightness of the CRTs was examined when a current of 500 μA was supplied. The results are shown in Table 1.

TABLE 1

| Example | Cerium Content (mol %) | 25% Water Glass (ml) | Water Glass Content (%) | 2% Barium Nitrate (ml) | State of Phosphor Screen | Reaction of Phosphor Screen with Lacquer Film | Relative Brightness |
|---|---|---|---|---|---|---|---|
| 1 | 0.01 | 5 | 0.21 | 0 | Flowing | — | — |
| 2 | 0.03 | 5 | 0.21 | 0 | Flowing | — | — |
| 3 | 0.1 | 5 | 0.21 | 0 | Flowing | — | — |
| 4 | 0.3 | 5 | 0.21 | 0 | Flowing | — | — |
| 5 | 1 | 5 | 0.21 | 0 | Flowing | — | — |
| 6 | 3 | 5 | 0.21 | 0 | Flowing | — | — |
| 7 | 0.01 | 8 | 0.33 | 0 | Good | Good | 90 |
| 8 | 0.03 | 8 | 0.33 | 0 | Good | Good | 100 |
| 9 | 0.1 | 8 | 0.33 | 0 | Good | Good | 103 |
| 10 | 0.3 | 8 | 0.33 | 0 | Good | Good | 93 |
| 11 | 1 | 8 | 0.33 | 0 | Good | Good | 90 |
| 12 | 3 | 8 | 0.33 | 0 | Good | Good | 47 |
| 13 | 0.01 | 20 | 0.83 | 0 | Good | Good | 92 |
| 14 | 0.03 | 20 | 0.83 | 0 | Good | Good | 103 |
| 15 | 0.1 | 20 | 0.83 | 0 | Good | Good | 106 |
| 16 | 0.3 | 20 | 0.83 | 0 | Good | Good | 96 |
| 17 | 1 | 20 | 0.83 | 0 | Good | Good | 92 |
| 18 | 3 | 20 | 0.83 | 0 | Good | Good | 48 |
| 19 | 0.01 | 50 | 2.08 | 0 | Good | Good | 95 |
| 20 | 0.03 | 50 | 2.08 | 0 | Good | Good | 105 |
| 21 | 0.1 | 50 | 2.08 | 0 | Good | Good | 109 |
| 22 | 0.3 | 50 | 2.08 | 0 | Good | Good | 98 |
| 23 | 1 | 50 | 2.08 | 0 | Good | Good | 95 |
| 24 | 3 | 50 | 2.08 | 0 | Good | Good | 49 |
| 25 | 0.01 | 100 | 4.17 | 0 | Good | Good | 100 |
| 26 | 0.03 | 100 | 4.17 | 0 | Good | Good | 111 |
| 27 | 0.1 | 100 | 4.17 | 0 | Good | Good | 115 |
| 28 | 0.3 | 100 | 4.17 | 0 | Good | Good | 104 |
| 29 | 1 | 100 | 4.17 | 0 | Good | Good | 100 |
| 30 | 3 | 100 | 4.17 | 0 | Good | Good | 52 |
| 31 | 0.01 | 120 | 5.00 | 0 | Good | Good | 100 |
| 32 | 0.03 | 120 | 5.00 | 0 | Good | Good | 111 |
| 33 | 0.1 | 120 | 5.00 | 0 | Good | Good | 115 |
| 34 | 0.3 | 120 | 5.00 | 0 | Good | Good | 104 |
| 35 | 1 | 120 | 5.00 | 0 | Good | Good | 100 |
| 36 | 3 | 120 | 5.00 | 0 | Good | Good | 52 |
| 37 | 0.01 | 150 | 6.25 | 0 | Good | Poor | 85 |
| 38 | 0.03 | 150 | 6.25 | 0 | Good | Poor | 95 |
| 39 | 0.1 | 150 | 6.25 | 0 | Good | Poor | 98 |
| 40 | 0.3 | 150 | 6.25 | 0 | Good | Poor | 89 |
| 41 | 1 | 150 | 6.25 | 0 | Good | Poor | 85 |
| 42 | 3 | 150 | 6.25 | 0 | Good | Poor | 44 |
| 43 | 0.01 | 8 | 0.33 | 10 | Semi-Gelled | — | — |
| 44 | 0.03 | 8 | 0.33 | 10 | Semi-Gelled | — | — |
| 45 | 0.1 | 8 | 0.33 | 10 | Semi-Gelled | — | — |
| 46 | 0.3 | 8 | 0.33 | 10 | Semi-Gelled | — | — |
| 47 | 1 | 8 | 0.33 | 10 | Semi-Gelled | — | — |
| 48 | 3 | 8 | 0.33 | 10 | Semi-Gelled | — | — |
| 49 | 0.01 | 50 | 2.08 | 6 | Good | Fair | — |
| 50 | 0.03 | 50 | 2.08 | 6 | Good | Fair | — |
| 51 | 0.1 | 50 | 2.08 | 6 | Good | Fair | — |
| 52 | 0.3 | 50 | 2.08 | 6 | Good | Fair | — |
| 53 | 1 | 50 | 2.08 | 6 | Good | Fair | — |
| 54 | 3 | 50 | 2.08 | 6 | Good | Fair | — |
| 55 | 0.01 | 100 | 4.19 | 6 | Good | Fair | — |
| 56 | 0.03 | 100 | 4.19 | 6 | Good | Poor | — |
| 57 | 0.1 | 100 | 4.19 | 6 | Good | Poor | — |
| 58 | 0.3 | 100 | 4.19 | 6 | Good | Poor | — |
| 59 | 1 | 100 | 4.19 | 6 | Good | Poor | — |
| 60 | 3 | 100 | 4.19 | 6 | Good | Poor | — |

The content of cerium is within a range of 0.01 to 0.3 mol % in the cerium-activated calcium sulfide phosphors according to the present invention. The content of water glass used in the method for manufacturing phosphor screens according to the present invention is within a range of 0.3 to 5% by weight. A barium salt is not used in this method. Therefore, examples according to the present invention include Examples 7 to 10, 13 to 16, 19 to 22, 25 to 28 and 31 to 34, while other examples are comparative examples in Table 1.

As is apparent from Table 1, if the barium salt is not used and the content of water glass is within 0.3 to 5% by weight, good phosphor screens are prepared. Further, the reaction with the lacquer film does not occur. The phosphors prepared in the examples according to the present invention have better dispersion in the precipitation solution than the conventional zinc silicate and gadolinium oxysulfide phosphors. Therefore, if the particle size is identical, a smooth screen surface is obtained.

Referring to Table 1, variation of brightness on the CRT screen may be found. This is caused by variations in the "dead voltage" during manufacture of the phosphor and the CRT. The "dead voltage" of the precipitated film is within the range of 3.7 to 4.5 KV. A difference of 0.8 KV results in irregular brightness on the CRT screen. However, if a voltage of 28 KV is applied across the CRT, the difference of 0.8 KV is negligible. Further, an increase in the "dead voltage" during baking is about 0.2 KV. Therefore, this increase is negligible where brightness of the CRT is a factor.

EXAMPLE 61

Brightness of the CRT in Example 15 was compared with that of the conventional CRT using gadolinium oxysulfide. A voltage of 28 KV was applied to these CRTs with changes in an electron beam current. Obtained results are shown in FIG. 1. Curve X indicates a case in which the CRT in Example 15 is examined, while curve Y indicates a case in which the conventional CRT is examined. As is apparent from FIG. 1, the CRT in Example 15 is brighter than the conventional CRT.

EXAMPLE 62

A voltage of 28 KV was applied to CRTs in Examples 13 to 18 (in which the content of cerium in the phosphor varies) and an electron beam current of 500 $\mu$A was made to flow therethrough, and the brightness of the CRTs were measured. Each faceplate of the CRTs was kept at temperatures of 25° (room temperature), 60°, 100°, 150° and 200° C. Each faceplate, except the faceplate to be kept at 25° C., was heated by a heater and kept at these temperatures. Therefore, in the measurement of the brightness of the faceplate kept at 25° C., no heater was used to heat the faceplate.

Figure 2:
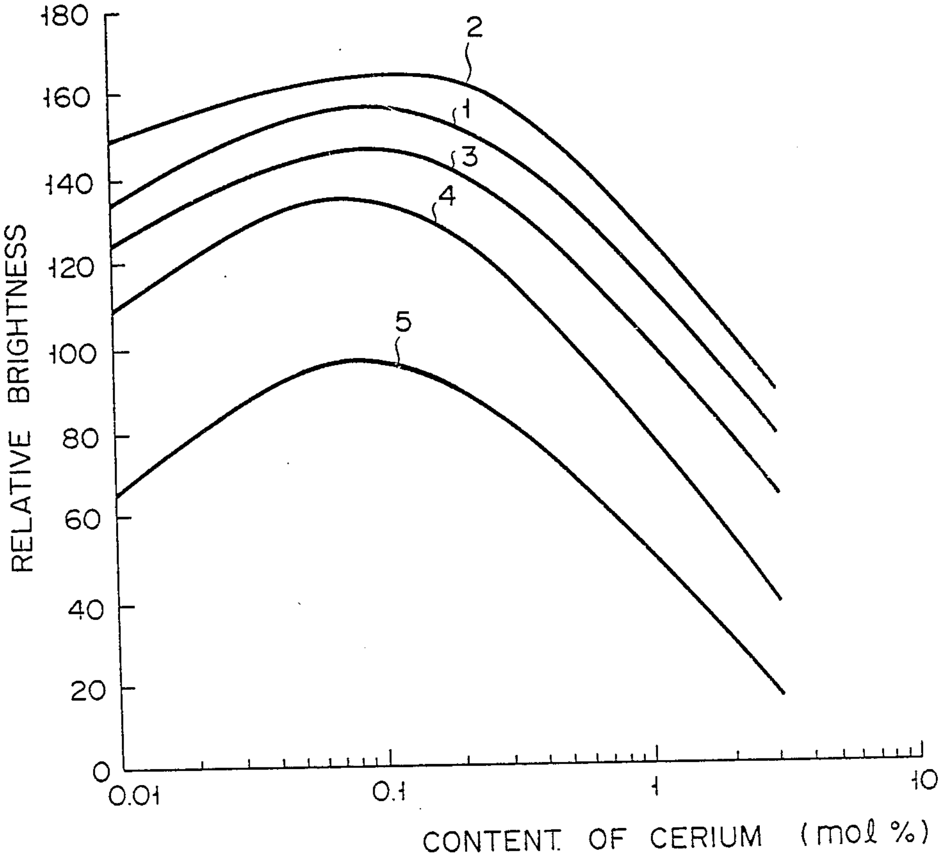
FIG. 2 is a graph showing the relationship between the cerium content in a phosphor and the relative brightness at various temperatures.

Results are shown in FIG. 2. "Relative brightness" plotted along the axis of abscissa was determined such that brightness is defined as 100 when the faceplate of the CRT using a terbium-activated gadolinium oxysulfide phosphor was kept at a temperature of 60° C. and an electron beam current of 500 $\mu$A flowed therethrough. Curves 1, 2, 3, 4 and 5 are plotted when the faceplate is kept at temperatures of 25°, 60°, 100°, 150° and 200° C., respectively.

Referring to FIG. 2, if the content of cerium in the cerium-activated calcium sulfide phosphor is within a range of 0.01 to 0.3 mol %, highly efficient fluorescence is performed even if the faceplate is heated to a temperature of 150° C. Further, if the content of cerium is within a range of 0.03 to 0.2 mol %, practically acceptable brightness can be obtained even if the faceplate is heated even to a temperature of 200° C. Therefore, if a phosphor screen of the projection type CRT whose faceplate may be subject to a temperature of 150° C. is made of the cerium-activated calcium sulfide phosphor containing 0.01 to 0.3 mol % of cerium, an adequately bright projection type green CRT can be obtained.

EXAMPLE 63

Brightness of the CRT in Example 15 was measured with changes in faceplate temperature increments from 0° to 200° C. (room temperature is expressed as 0° C.) in comparison with brightness of the CRT using the conventional terbium-activated gadolinium sulfide phosphor. Brightnesses of the CRTs were adjusted to be the same when the faceplates were kept at a temperature of 0° C. (room temperature 25° C.). Thereafter, these faceplates were heated.

Figure 3:
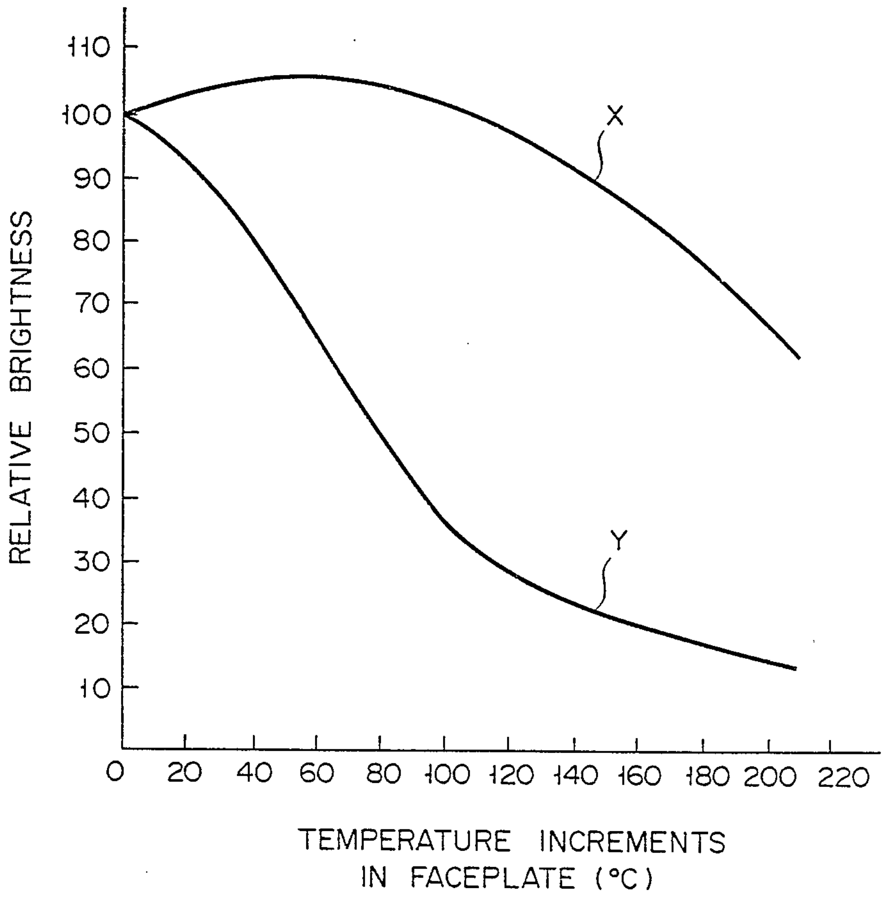
FIG. 3 is a graph showing brightness of the CRT according to the present invention as a function of the faceplate temperature in comparison with brightness of the conventional CRT as a function of the faceplate temperature.

Results are shown in FIG. 3. Curve X indicates a case in which the CRT in Example 15 is examined, while curve Y indicates a case in which the conventional CRT using terbium activated gadolinium oxysulfide is examined. The brightness of the faceplate kept at "0° C." indicates the brightness of the faceplate measured at room temperature.

As is apparent from FIG. 3, in the conventional CRT using the terbium-activated gadolinium oxysulfide phosphor, brightness is seriously degraded with an increase in the temperature of the faceplate. However, in the CRT according to the present invention, even if the faceplate temperature is increased, brightness of the CRT is degraded only moderately. The maximum brightness is obtained when the faceplate is heated to a temperature of about 60° C. This feature has never been found in the conventional CRTs.

EXAMPLE 64

In order to assemble a projection video device including the projection type green CRT of the present invention, the present inventors searched for blue and red CRTs for optimal tone contrast. The present inventors found that a blue CRT using a silver-activated zinc sulfide phosphor and a red CRT using an europium-activated yttrium oxide phosphor were preferred. The content of silver in the silver-activated zinc sulfide phosphor is preferably 0.005 to 0.02 mol %, while the content of europium in the europium-activated yttrium oxide phosphor is preferably 1 to 6 mol %.

These projection type blue and red CRTs were prepared in the same precipitation method using water glass and barium solutions as described before. The faceplate temperatures of these CRTs were changed from 0° to 60° C. to measure brightness thereof.

Figure 4:
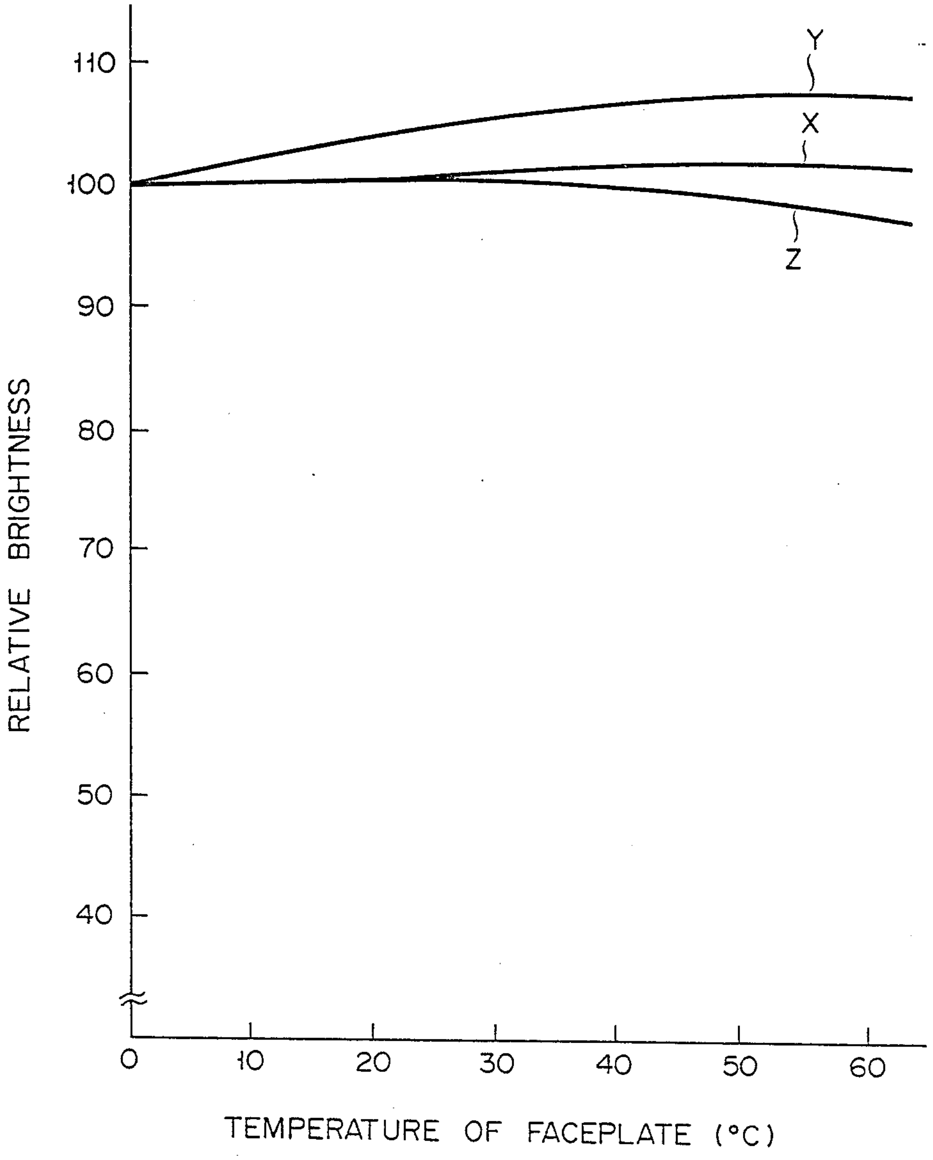
FIG. 4 is a graph showing relative brightness of three CRTs arranged in a projection video device of the present invention as a function of faceplate temperatures of these CRTs.

Results are shown in FIG. 4. Curve X indicates a case in which brightness of the green CRT in Example 15 was measured, curve Y indicates a case in which brightness of the blue CRT was measured, and curve Z indicates a case in which brightness of the red CRT was measured. As is apparent from FIG. 4, brightnesses of these CRTs are well balanced. When the projection video device adopting these CRTs is assembled, color change of the color image does not occur even if the temperature of the faceplate is increased over time.

Figure 5:
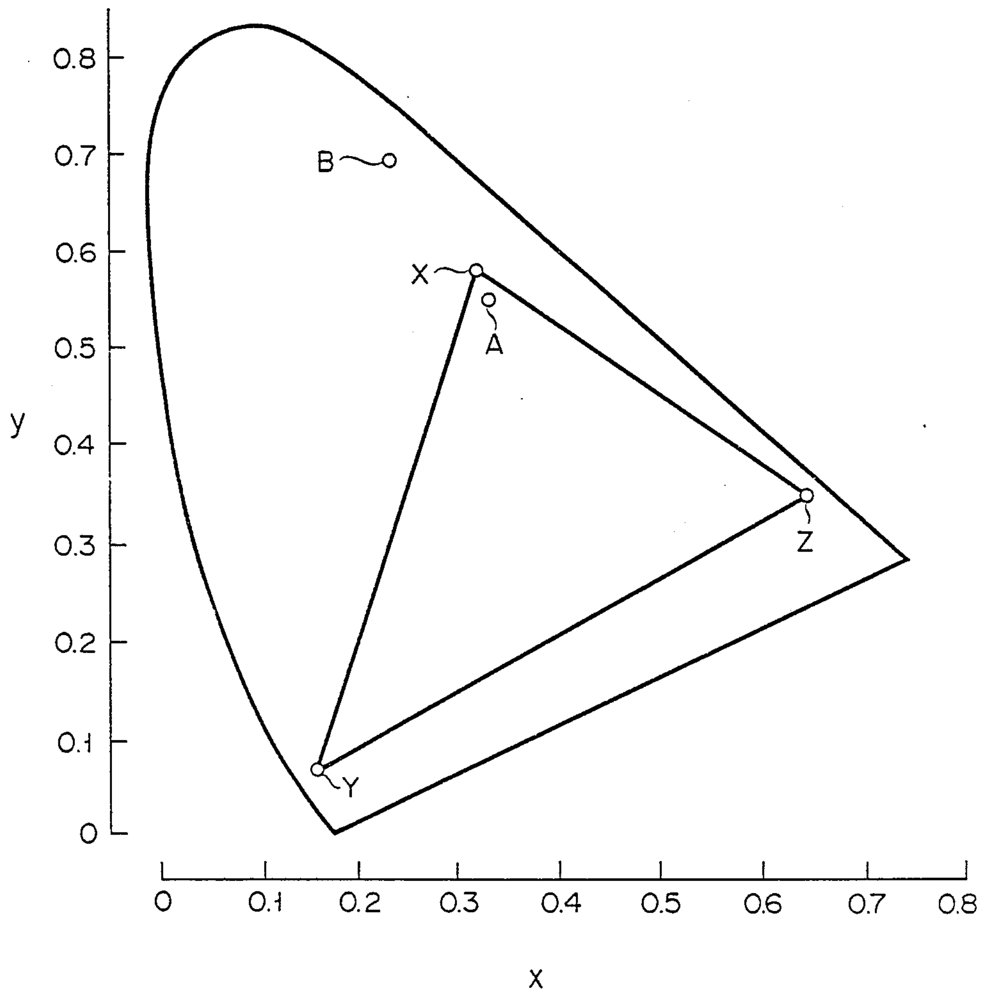
FIG. 5 is a graph showing a CIE chromaticity characteristic curve for explaining the chromaticity region of the projection video device according to the present invention.

Chromaticity points of the CRTs are shown in FIG. 5. Point X ($x=0.326$, $y=0.571$) denotes green, point Y denotes blue, and point Z denotes red. Point A denotes a chromaticity point ($x=0.325$, $y=0.543$) of terbium-activated gadolinium oxysulfide and point B denotes a chromaticity point ($x=0.23$, $y=0.69$) of manganese-activated zinc silicate. Point X has a sufficiently large color reproducibility range.

These CRTs were assembled on a means for reproducing color images so as to manufacture a projection video device and the image quality was evaluated. As a result, an image projected on a screen was focused properly and was brighter than the conventional color image. Thus, the advantage of beauty of green color was proved. Since burning in the CRT and the decrease of green color component did not occur even if the temperature of the faceplate was increased, the quality of color images was not substantially degraded over a long period of time.

Figure 7:
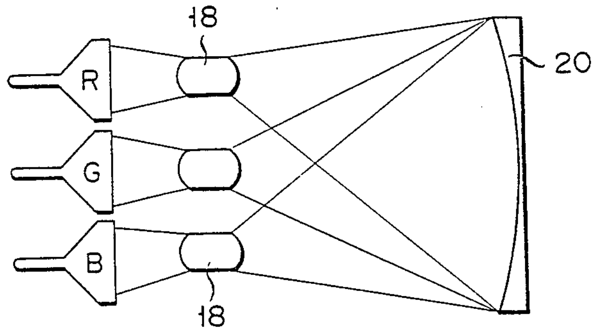
FIG. 7 is a view showing an example of a projection video device according to the present invention.

Any type of color-image reproducing means which are used in conventional projection type video devices may be used for the present invention. The above-mentioned devices are known to those who are skilled in the art, and a detailed description thereof is not necessary here. However, a projection type video device used for this image quality evaluation is schematically illustrated in FIG. 7. As shown in FIG. 7, light from each CRT is imaged on a external screen 20 by means of a projection lens 18.

Figure 6:
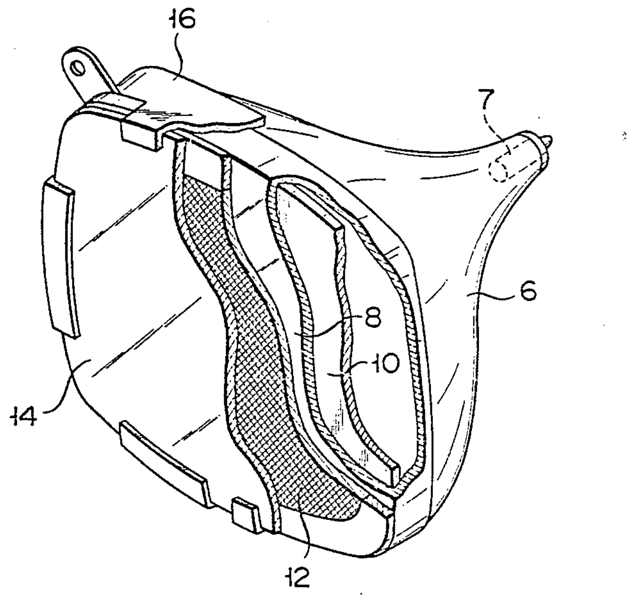
FIG. 6 is a view showing a simple cooling means which may be used in the CRT according to the present invention.

Since brightness of the projection type green CRT according to the present invention is not substantially degraded due to an increase in the temperature of the faceplate, a simple cooling means may be used as compared with the conventional cooling means. An arrangement shown in FIG. 6 may be adopted. A phosphor screen 10 on which an electron beam emitted from an electron gun 7 is radiated is formed on the inner surface of a faceplate 8 of a main body 6. A front glass screen 14 is formed on the outer surface of the faceplate 8 through a metal mesh plate 12. The peripheries of the front glass screen 14 and the main body 6 are fixed by a fixing metal member 16 so as to bring the faceplate 8 in tight contact with the metal mesh plate 12. Heat in the faceplate 8 is conducted to the metal mesh plate 12 and then to the fixing metal member 16. Heat conducted to the fixing metal member 16 is dissipated in the air. The fixing metal member 16 thus also functions as a radiator. With the above arrangement, a fan for cooling the device is not required, resulting in simple construction.

EXAMPLE 65

Brightness of the projection type 7" green CRT (raster area: $13 \times 10$ cm) with the above arrangement was measured during continuous operation for 60 minutes in comparison with brightness of the conventional CRT during operation for 60 minutes.

Results are shown in Table 2. A terbium-activated gadolinium oxysulfide phosphor screen was used and a cooling means was not used, in the CRT of Conventional Example 1. In Conventional Example 2, the same CRT as in Conventional Example 1 was used and a fan for cooling the CRT was adopted.

TABLE 2

| | Initial Brightness (A) | Brightness After 60 min (B) | (B)/(A) |
|---|---|---|---|
| Conventional Example 1 | 94 | 80 | 0.85 |
| Conventional Example 2 | 100 | 90 | 0.90 |
| Present Invention | 100 | 106 | 1.06 |

Even if the CRT according to the present invention does not have a cooling means and has a simple construction, brightness of this CRT after 60 minutes is 32.5% higher than that of the conventional CRT in Comparative Example 1 and 17.8% higher than that of the CRT in Comparative Example 2. Further, brightness of the CRT according to the present invention has increased after 60 minutes from that in the initial period of operation. Therefore, although brightness of the projection video device using the conventional green CRT is decreased over time, screen images may not substantially become reddish over time in the projection type video device according to the present invention.

What we claim is:

1. A projection type green cathode ray tube comprising:
   - a main body having a transparent faceplate;
   - a phosphor screen formed on the inner surface of said faceplate, said phosphor screen including a cerium-activated calcium sulfide phosphor which contains 0.01 to 0.3 mol % of cerium; and
   - means housed in said main body for emitting an electron beam on said phosphor screen, said means being capable of radiating the electron beam with energy sufficient to project an image on said faceplate onto an external screen.

2. The cathode ray tube according to claim 1, wherein the content of cerium in said cerium-activated calcium sulfide phosphor is within a range of 0.03 to 0.2 mol %.

3. The cathode ray tube according to claim 1, wherein said phosphor screen consists essentially of said cerium-activated calcium sulfide phosphor.

4. A method for projecting a green image on a screen which comprises:
   - preparing a cathode ray tube according to any one of claims 1 to 3;
   - displaying an image on the faceplate by radiating an electron beam on the phosphor screen of said cathode ray tube; and 5. A method for forming said phosphor screen of claim 1, comprising the steps of:
   - (a) adding a cerium-activated calcium phosphor containing 0.01 to 0.3 mol % of cerium to an aqueous solution of water glass to form a suspension;
   - (b) pouring pure water in said main body with said faceplate of said main body facing downward; and
   - (c) adding said suspension to said pure water to precipitate said cerium-activated calcium phosphor on the inner surface of said faceplate and to form said phosphor screen;
   - wherein the concentration of said water glass after addition of said suspension to said pure water is 0.3 to 5% by weight.

6. The method according to claim 5, wherein the steps are performed in the absence of barium ions.

7. A projection video device comprising:
   - a green cathode ray tube according any one of claims 1 to 3;
   - a blue cathode ray tube with a phosphor screen made of a silver-activated zinc sulfide;
   - a red cathode ray tube with a phosphor screen made of an europium-activated yttrium oxide phosphor; and
   - means for enlarging and projecting images, which are displayed on said faceplates of said green, blue and red cathode ray tubes, onto a screen.

* * * * *